United States Patent
Cosfeld et al.

(10) Patent No.: US 6,499,447 B2
(45) Date of Patent: Dec. 31, 2002

(54) PROCESS FOR OPERATING AN ELECTROMAGNETIC ACTUATOR

(75) Inventors: Ralf Cosfeld, Munich (DE); Konrad Reif, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/809,297

(22) Filed: Mar. 16, 2001

(65) Prior Publication Data

US 2001/0022163 A1 Sep. 20, 2001

(30) Foreign Application Priority Data

Mar. 16, 2000 (DE) .......................................... 100 12 988

(51) Int. Cl.$^7$ ................................................. F01L 9/04
(52) U.S. Cl. ............................... 123/90.11; 251/129.15; 251/129.16
(58) Field of Search ................... 123/90.11; 251/129.1, 251/129.15, 129.16

(56) References Cited

U.S. PATENT DOCUMENTS

| | | | | |
|---|---|---|---|---|
| 4,706,619 A | * | 11/1987 | Buchl | ....................... 123/90.11 |
| 4,715,332 A | * | 12/1987 | Kreuter | .................... 123/90.11 |
| 4,782,798 A | * | 11/1988 | Jones | ....................... 123/90.11 |
| 6,003,481 A | * | 12/1999 | Pischinger | ............... 123/90.11 |
| 6,176,207 B1 | * | 1/2001 | Wright | ..................... 123/90.11 |
| 6,234,122 B1 | * | 5/2001 | Kirschbaum | ............. 123/90.11 |

FOREIGN PATENT DOCUMENTS

| | | |
|---|---|---|
| DE | 197 14 518 | 10/1998 |
| DE | 198 34 548 | 2/2000 |
| EP | 0 973 177 | 1/2000 |
| EP | 0 973 178 | 1/2000 |

* cited by examiner

Primary Examiner—Jaimie Corrigan
(74) Attorney, Agent, or Firm—Crowell & Moring LLP

(57) ABSTRACT

A process for operating an electromagnetic actuator is provided, in particular to actuate a gas exchange lift valve of an internal combustion engine, with an armature, which is moved oscillatingly between two electromagnetic coils against the force of at least one return spring via an alternating supply of current to the electromagnetic coils. Whereby, during the so-called catch process as the armature approaches the coil that is subjected first to a current flow, the voltage applied to the coil catching the armature is reduced. To avoid unnecessary losses, a voltage curve is chosen with which an eddy current, calculated with a mathematical model, is minimized in the armature.

8 Claims, 3 Drawing Sheets

PROCESS FOR OPERATING AN ELECTROMAGNETIC ACTUATOR

BACKGROUND AND SUMMARY OF THE INVENTION

This application claims the priority of German Application No. 100 12 988.8, filed Mar. 16, 2000, the disclosure of which is expressly incorporated by reference herein.

The invention relates to a process for operating an electromagnetic actuator and, more particularly, to a process for actuating a gas exchange lift valve of an internal combustion engine, with an armature, which is moved oscillatingly between two electromagnetic coils against the force of at least one return spring via an alternating supply of current to the electromagnetic coils.

A preferred application for an electromagnetic actuator of the type described above is for electromagnetically actuating a valve drive mechanism of an internal combustion engine. That is, the gas exchange lift valves of an internal combustion piston engine are actuated by such actuators in the desired manner, so as to be opened and closed in an oscillating manner. In such an electromechanical valve drive mechanism, the lift valves are moved individually (or also in groups) by means of electromechanical actuating elements - the so-called actuators - whereby the time for opening and closing each lift valve can be selected in essence arbitrarily. Thus, the valve timing of the internal combustion engine can be adjusted optimally to the current operating state (which is defined by the speed and the load) and to the respective requirements with respect to consumption, torque, emission, comfort and response characteristics of a motor vehicle, driven by the internal combustion engine.

The essential components of a known actuator for actuating the lift valves of an internal combustion engine are an armature and two electromagnets for holding the armature in the position "lift valve open" or "lift valve closed" with the related electromagnetic coils. Furthermore, return springs are provided for the movement of the armature between the position "lift valve open" and "lift valve closed". In this respect reference is also made to the attached FIG. 1, which depicts such an actuator with a related lift valve in the two possible end positions of the lift valve and the actuator-armature. Between the two illustrated states or positions of the actuator lift valve unit, diagrams illustrate the curve of the armature lift z or the armature path between the two electromagnetic coils and, furthermore, the current flow I in the two electromagnetic coils over time t in accordance with the known state of the art (which is simpler than the mechanism described in German Patent document DE 195 30 121 A1, discussed in the introductory part of the specification).

FIG. 1 depicts the closing operation of an internal combustion engine lift valve, which is marked with the reference numeral 1. As usual, a valve closing spring 2a acts on the lift valve 1. Furthermore, the actuator, which is generally designated by reference numeral 4 in its entirety, acts on the shaft of the lift valve 1 - here with intercalation of a hydraulic valve play compensating element 3 (which is not absolutely necessary). The actuator 4 comprises not only two electromagnetic coils 4a, 4b, but also a push rod 4c, which acts on the shaft of the lift valve 1 and which bears an armature 4d. The armature 4d can be slid longitudinally and oscillatingly between the electromagnetic coils 4a, 4b. Furthermore, a valve opening spring 2b acts on the end of the push rod 4c, facing away from the shaft of the lift valve 1.

Thus, FIG. 1 depicts an oscillatory system, for which the valve closing spring 2a and the valve opening spring 2b form a first and a second return spring, for which consequently the reference numerals 2a, 2b are also used.

The first end position of this oscillatory system is shown on the left hand side of FIG. 1, where the lift valve 1 is completely open and the armature 4d rests against the bottom electromagnetic coil 4b. This coil 4b is also called hereinafter the opener coil 4b, since it holds the lift valve 1 in its opened position.

The second end position of the oscillatory system is shown on the right hand side of FIG. 1, where the lift valve 1 is completely closed and the armature 4d rests against the upper electromagnetic coil 4a. This coil 4a is also called hereinafter the closer coil 4a, since it holds the lift valve 1 in its closed position.

At this point, the closing operation of the lift valve 1 will now be described, that is, in FIG. 1 the transition from the open state, illustrated on the left hand side, into the closed state, illustrated on the right hand side. Between the two sides the corresponding curves of the electrical currents I, flowing into the coils 4a, 4b, and the lift curve or the path coordinate z of the armature 4d are plotted, respectively, over time t.

Starting from the left-hand side position "lift valve open", the supply of current is guided first to the opener coil 4b so that the armature 4d pushes in this position against the stressed valve closing spring 2a (=bottom first return spring 2a), whereby the current I in this coil 4b is shown with a dashed line in the I–t diagram. If at this stage the current I of the opener coil 4b is turned off for a desired transition to "lift valve closed", the armature 4d detaches from this coil 4b and the lift valve 1 is accelerated by means of the stressed valve closing spring 2a into approximately its central position (in the direction toward the top of the page), but then continues to move owing to its mass inertia so as to thereby stress the valve opening spring 2b, so that the lift valve 1 (and the armature 4d) are decelerated. Then, at an appropriate time, the supply of current is guided to the closer coil 4a (the current I for the coil 4a is shown with a solid line in the I–t diagram). Thus, this coil 4a "catches" the armature 4d (this operation is the so-called "catch" process), and holds it finally in the position "lift valve closed", illustrated on the right hand side of FIG. 1. After the armature 4d has been securely caught by the coil 4a, the current in this coil is switched over, moreover, to a lower holding current level (see I–t diagram).

Starting from the position, illustrated on the right hand side in FIG. 1, the reverse transition from "lift valve closed" to "lift valve open" takes place analogously. The current I in the closer coil 4a is turned off and the current for the opener coil 4b is turned on with a time delay. Generally, for the supply of current to be guided to the coils 4a, 4b, sufficient electric voltage is applied to said coils, whereas the turning off of the electric current I is triggered by lowering the electric voltage to the value "zero". The necessary electric energy for operating each actuator 4 is taken either from the electrical system of the vehicle, driven by the related internal combustion engine, or provided by means of a separate energy supply, adjusted to the valve drive mechanism of the internal combustion engine. In this respect the electric voltage is held constant by the energy supply; and the coil current I of the actuators 4, assigned to the internal combustion engine lift valves 1, is controlled in such a manner by a controller that the necessary forces for the opening, closing and holding of the lift valve(s) 1 in the desired position are generated.

In the state of the art, described above, the aforementioned controller or a control unit adjusts through timing the coil current I during the so-called catch process (wherein one of the two coils 4a, 4b endeavors to catch the armature 4d) to a value that is large enough to catch reliably the armature 4d under all conditions. Now the force of the catching electromagnetic coil 4a or 4b on the armature 4d is approximately proportional to the current I and inversely proportional to the distance between the coil and the armature. If at this stage—as in the known state of the art —a constant current I is set, the magnetic force, acting on the armature 4d, increases, as it approaches the respective coil 4a or 4b, catching it, inversely proportional to the remaining gap, thus increasing the acceleration and speed of the armature. The result is a high landing speed of the armature 4b on the respective electromagnetic coil 4a or 4b, the consequence of which is, first of all, high wear in the actuator 4 and, secondly, also high significant noise development. Another drawback lies in the change over losses of the transistors, which losses are generated during the briefly described timed current regulation and which result in increased power absorption and temperature load on the controller that is used and increased electromagnetic radiation into the leads of the actuators.

The state of the art, disclosed in German Patent document DE 195 30 121 A1 discussed above, does offer an improvement especially with respect to the noise development and the actuator wear. It proposes a process for reducing the landing speed of the armature on an electromagnetic actuator. As the armature approaches the pole surface of the coil catching the armature, the voltage, applied to this coil, is limited (that is, essentially reduced) to a specified maximum value so that the current, flowing through the coil, drops during a part of the time that the voltage is limited. Furthermore, it is also stated that the degree to which the voltage is limited or reduced can be specified in a family of characteristics. The corresponding values and, in particular, also the respective time at which this voltage reduction is supposed to start, can be determined experimentally.

The German Patent document DE 198 32 198 A1 describes a process for reducing the landing speed of an armature on the electromagnetic actuator, where in the braking phase, which follows a catch phase, a timed electric voltage is applied. In so doing, the respective switching times and the voltage-to-timing ratio of a regulator are determined with the aid of a desired trajectory, describing the desired movement of the armature.

The actual voltage curves for the implementation of this process are usually found with so-called controller based design methods. They involve empirical or numerical, thus arithmetic methods, with which a voltage curve is determined when specific boundary conditions are set and with which the desired result can be shown.

However, these past methods did not take into consideration that from time to time there are high current eddies in the armature. These eddies result in energy losses and inaccuracies in the individual valve timing. In the past these drawbacks were remedied in that the current eddies were largely avoided through the use of a laminated armature or an armature with low electric conductivity. However, such solutions usually lead to higher costs.

The object of the present invention is therefore to provide a process in which the high current eddies in the armature can be largely avoided during the operation of an electromagnetic actuator.

This problem is solved according to the invention by a process for operating an electromagnetic actuator, in particular to actuate a gas exchange lift valve of an internal combustion engine, with an armature, which is moved oscillatingly between two electromagnetic coils against the force of at least one return spring via an alternating supply of current to the electromagnetic coils and whereby, as the armature approaches the coil subjected first to a current flow, during the so-called catch process the voltage, applied to the coil catching the armature, is reduced, characterized in that a voltage control method is chosen with a voltage curve, with which an eddy current, calculated with a mathematical model, is minimized in the armature.

An important idea of the present invention is the consideration of the eddy currents, induced in the armature, during preparation of the voltage curve to regulate/control the electromagnetic actuator. From a number of possible voltage curves, which allow the operation of an electric actuator in the required manner, a voltage curve can be selected in the sense of avoiding eddy currents.

To understand the invention it is helpful to design an equivalent circuit diagram for the magnetic fluxes that shows the magnetic sources and the magnetic resistances. In this equivalent circuit diagram the eddy current, induced in the armature, represents a magnetic flux source that generates a magnetic flux, which flows in the opposite direction to the other magnetic flux. In considering this magnetic flux source in a mathematical model, with which the current eddies in the armature can be calculated, a voltage control method can be chosen that results in a minimum eddy current.

Preferably, a mathematical or numerical model is used to find the voltage curve. One possibility for determining the voltage curve lies in the use of a so-called controller design method with variable structure, as is well known.

The voltage curve can then be realized by different ways and means, for example through pulse width modulation.

Other objects, advantages and novel features of the present invention will become apparent from the following detailed description of the invention when considered in conjunction with the accompanying drawings.

DETAILED DESCRIPTION OF THE DRAWINGS

Figure 1:
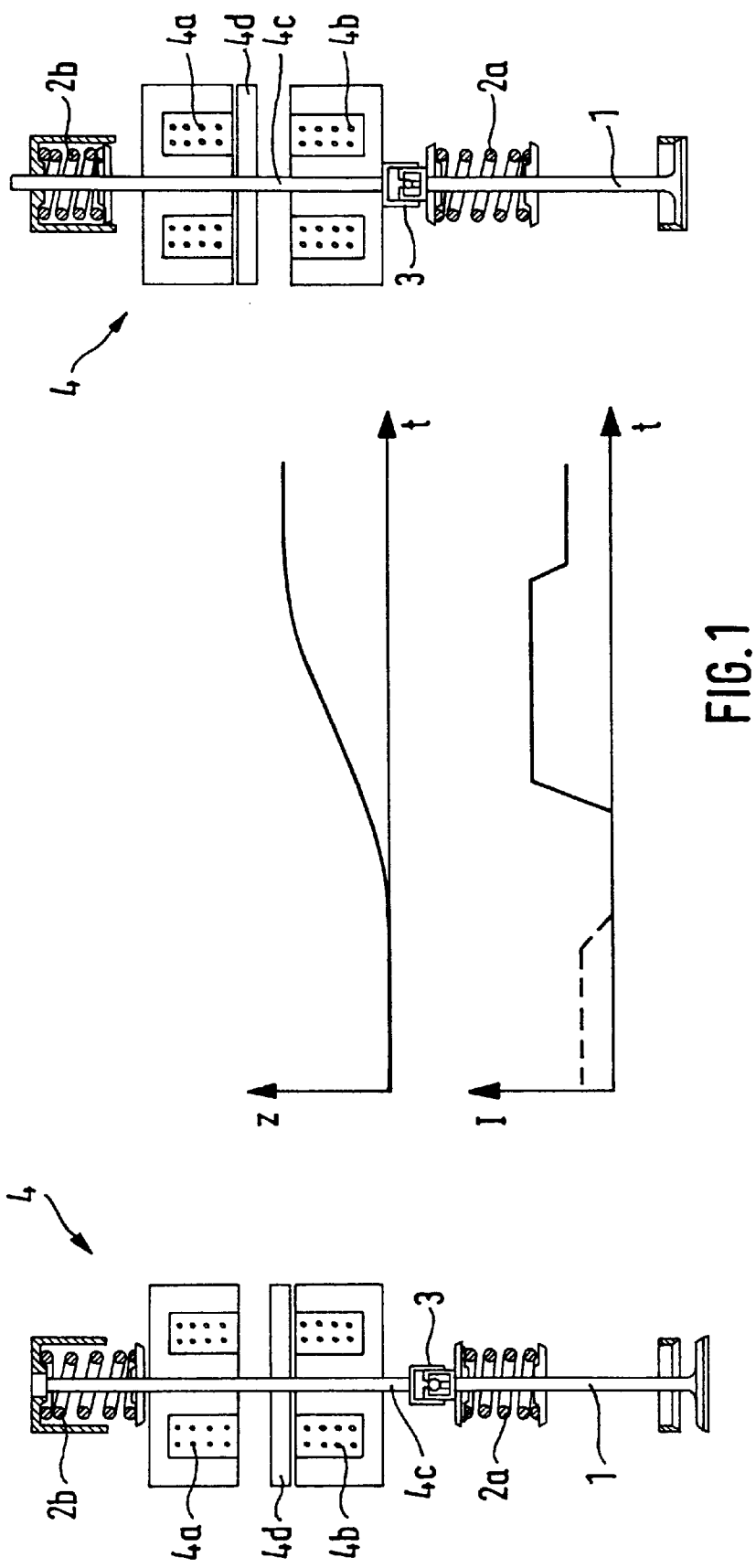
FIG. 1 is a schematic drawing of an electromagnetic actuator with a related lift valve in its two possible end positions, where the curve of the armature lift z and the curve of the current flow I in the two electromagnetic coils overtime are shown between the two illustrated states.

For the description of FIG. 1 reference is made to the explanation in the introductory part of the specification.

Figure 2:
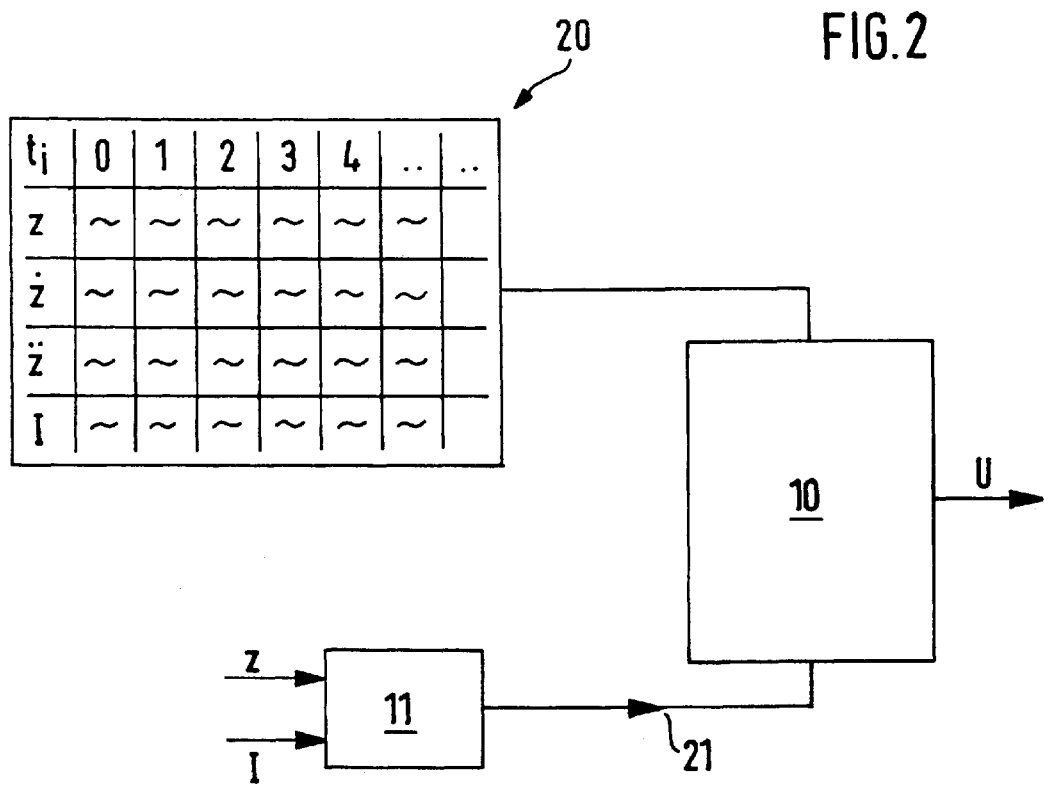
FIG. 2 is a schematic block diagram, where a control concept, according to one embodiment of the present invention, is shown.

FIG. 2 is a block diagram of one embodiment of a control model according to the invention. A controller 10 performs a control sequence with the aid of the signals of a desired trajectory 20 that describes the desired movement of the armature, where the signals of a subordinate observer 11 are processed. The output variable of the control model or the controller 10 is an electric voltage U, which is being or was applied to the coil 4a or 4b catching the respective armature 4d (see FIG. 1). This voltage U has, for example, a value, whose amount is fixed, and is applied by the controller 10 in a timed manner (pulse width modulation) to the respective coil 4a or 4b, whereby the sign of the electric voltage is determined in a suitable manner.

The position between the coils 4a, 4b, which corresponds to the lift curve of the lift valve 1 or the armature 4d, through the path coordinate z, which is measured in a suitable manner, is an input variable of the control model, described here. The path coordinate z is further processed by the observer 11. For the sake of simplicity, the position of the armature is hereinafter referred to as "z" without using the explanatory term "path coordinate".

The movement speed z' of the armature and the armature acceleration z" can be estimated or found from the path coordinate z by means of the first or second derivative over time. The value z and the variables z', z", derived from said value, are found by the observer 11 and sent as the so-called estimated value 21 to the controller 10.

Another input variable of the control model, which is described here and which is processed by the observer 11 in determining the estimated values 21, is the current flow I, determined in the respective coils 4a, 4b. "I" is a consequence of the applied voltage U.

The phases, depicted in the series of FIGS. 3a to 3d, represent the control sequence during the catch process by means of one of the two coils 4a, 4b in a system, according to FIG. 1.

Figure 3A:
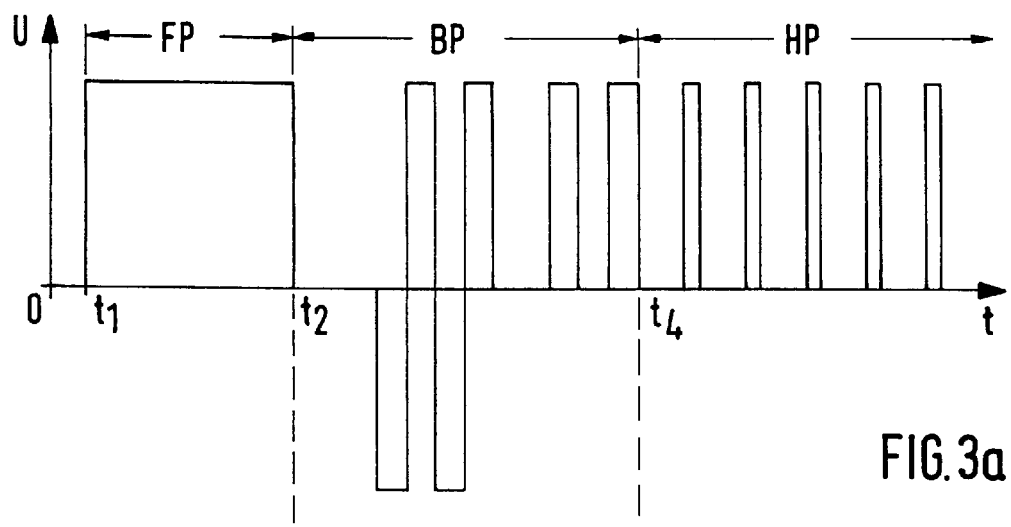
FIGS. 3a to 3d are diagrams, depicting the individual phases of a control sequence during the catch process.

In the top diagram (FIG. 3a) the electric voltage U, applied to the electromagnetic coil catching the armature, is plotted over time t, whereas in the second diagram (FIG. 3b) the related path coordinate z of the armature 4d is shown plotted against time. In FIG. 3a the individual phases, namely the catch phase FP, the braking phase BP and the holding phase HP (following landing of the armature on the coil) are marked.

With respect to the start of the catch phase FP at the time $t_1$, at which the coil catching the armature is loaded with the electric voltage U, this turn on time $t_1$, can be arbitrarily chosen in principle within certain limits. It must only be guaranteed that it is possible to catch the armature 4d at all. The determination of the voltage U or the voltage curve will be explained in detail below.

As FIG. 3a shows, the controller 10 divides the entire catch process of the armature 4d into two phases, namely the catch phase FP and a subsequent braking phase BP.

The latter phase follows as the third phase (holding phase HP), after the landing of the armature 4d on the respective coil 4a or 4b. In this phase the armature 4d is held reliably on the respective electromagnetic coil. To this end, the holding current control sequence can be switched over, a state that is induced, as illustrated, by a timed loading of the respective coil 4a, 4b with the electric voltage U.

In the braking phase BP, the voltage supply of the respective coil 4a or 4b, catching the armature 4d, is interrupted in this phase at time $t_2$, thus starting this braking phase BP. The respective times for turning on and off the voltage U, which is a constant or variable according to the amount, and the related sign is determined by the controller 10, according to a predetermined and previously fixed voltage curve.

The function of the controller 10 can be described as follows. To obtain a reduced landing speed on the respective coil 4a or 4b, the armature 4d must already be braked in a controlled manner in its catch phase, that is, during the actual landing. Of course, this braking phase BP should not prolong any longer than necessary the opening and closing time of the internal combustion engine lift valve 1, actuated by the actuator 4.

For the design of a controller 10 that meets these requirements, suitable state variables for the armature movement must first be chosen. Preferably, in addition to the armature position z and the armature speed z' (which can be found in principle through time differentiation of the armature position z), the armature acceleration z" is chosen as the third state variable, since as the direct derivative of the armature speed z', it also represents a variable that is easy to interpret.

Besides these three variables, namely the armature position z, the armature speed z' and the armature acceleration z", there are also other boundary conditions that will be explained below.

Figure 4:
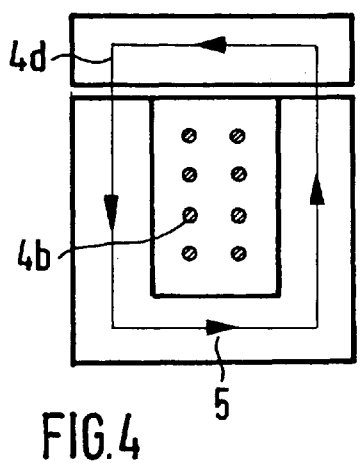
FIG. 4 is a schematic drawing of an actuator part with a sketched magnetic flux.

As depicted in FIG. 4 (which is a detailed illustration of an electric actuator, according to FIG. 1), there is a magnetic flux, generated by the current flow in the coils 4a or 4b. As evident from the equivalent circuit diagram, according to FIG. 5, the result is, first of all, a magnetic flux $\phi_c$ in the yoke. Furthermore, there is a magnetic flux $\phi_a$ in the armature 4d. In addition, there exists a stray magnetic flux $\phi_w$ between the two open ends of the yoke 5, and in particular not only when the armature is abutting but also when it is not abutting a coil.

Figure 5:
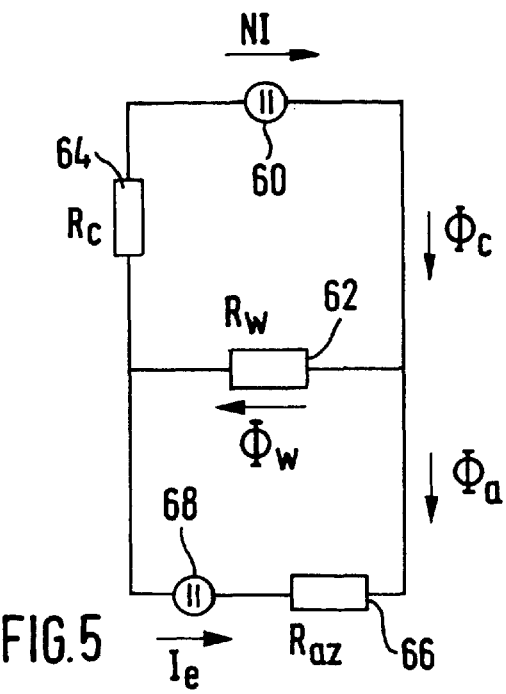
FIG. 5 is an equivalent circuit diagram of the magnetic flux, depicted in FIG. 4.

The reference numeral 60 in FIG. 5 denotes the magnetic flux source, which is generated by the coils 4a or 4b and which can be characterized by the number of coil windings N and the coil current I. The stray magnetic flux $\phi_2$, which takes place over the two open ends of the yoke 5, is described as the magnetic resistance $R_w$. The magnetic resistance $R_c$ (reference numeral 64) represents the magnetic resistance in the yoke 5. The magnetic resistance $R_{az}$ (reference numeral 66) represents the magnetic resistance in the armature, on the one hand, and in the air gap between the armature 4d and the yoke 5 in the event that the armature 4d does not completely rest on the yoke 5.

Reference numeral 68 denotes another magnetic flux source, which results from the current eddy $I_e$, induced in the armature 4d. The current eddy $I_e$, induced in the armature 4d, can be determined by means of a mathematical model. During the different phases (catch phase, braking phase) the controller 10 can now resort to the above described desired trajectory 20 in order to carry out its function. This desired trajectory contains, as a function of the time t, not only the values to be coordinated for the position z, the speed z', and the acceleration z" of the armature 4d, but also the current I, which must be taken into consideration for the voltage, induced in the armature 4d.

Thus, the desired trajectory 20 is nothing more than a table of desired values, deposited in a storage medium, such as a memory.

If at this stage during the operation of the electromagnetic actuator 4 the actual values for the position z, the speed z', and the acceleration z" of the armature 4d deviate too much from the desired values, the controller 10 corrects this by suitably turning the voltage U on and off. The controller 10 can be designed in detail using different methods of linear and nonlinear control theory, and hence there is no need to go into the details here.

With respect to setting up this table of values or the desired trajectory 20, a preferred embodiment proposes said table be calculated, among other things, from the boundary condition that the acceleration z" of the armature 4d ought to have the value 0 at the time of the landing on the respective electromagnetic coil 4a or 4b. Furthermore, the current I should be laid out in such a manner in the table of values that the resulting current eddies in the armature 4d can be minimized. In observing these conditions, the armature 4d can touch down in a jolt free manner on the coil 4a or 4b without any excessive current eddy losses in the armature 4d during the catch phase.

Figure 3B:
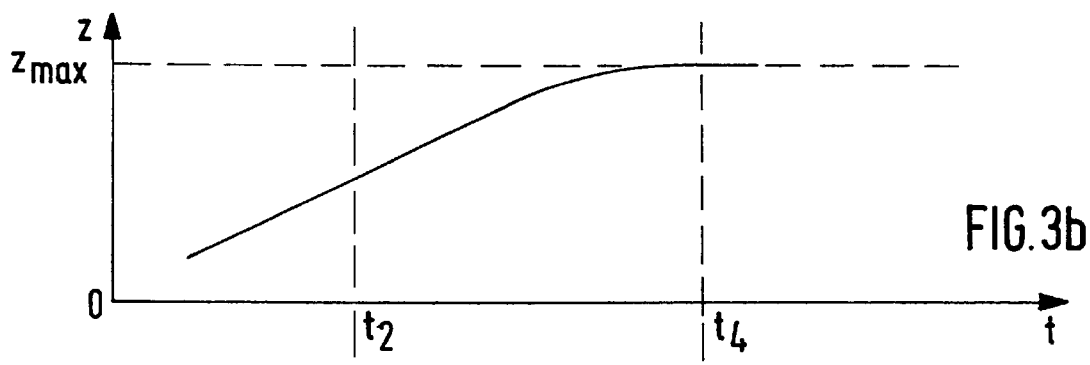
Figure 3C:
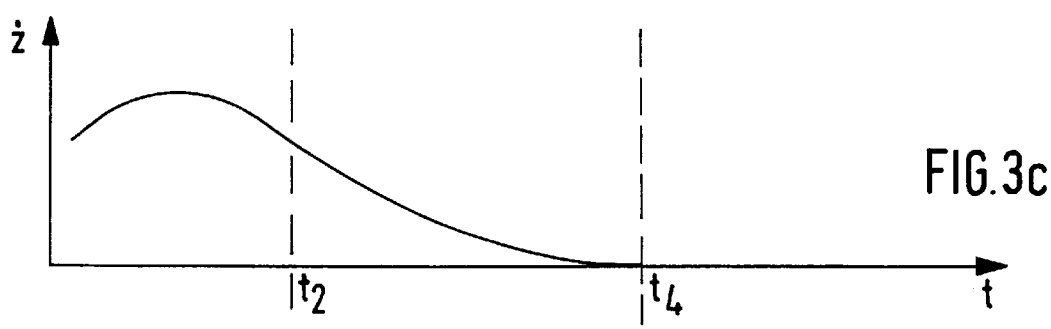
Figure 3D:
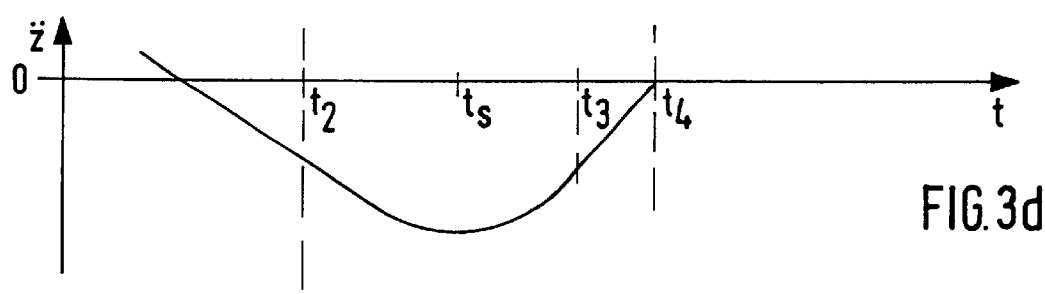

In FIGS. 3b, 3c, and 3d, the position z, the armature speed z' and the armature acceleration z" are plotted over time and in the end phase of the armature movement, that is, prior to the landing of the armature 4d on the coil 4a or 4b, catching said armature. Starting from time $t_2$, the actual control process is started and in particular until the landing time $t_4$, a state that terminates the braking phase BP.

As evident from the previous description, the controller 10 needs at least four state variables in the present process to carry out its function. Preferably, they are here the armature position z, the movement speed z' of the armature 4d, and the armature acceleration z", as well as the coil current I. It is logical to use the so-called observer 11 to determine the state variables, as already explained in connection with FIG. 2. In this observer 11, an actuator model is connected parallel to the actuator 4. Said actuator model is supplied with a variable, which is important for the actuator 4, namely with the variable of the current flow I, determined in the respective coil 4a, 4b. In this observer 11 the armature position, estimated on this basis, can be compared with the actually measured armature position z that is also sent to the observer 11 as the input variable. The resulting difference can then be fed back over a correction function to the variable or the so-called state variable of the actuator model. If the initial states are incorrectly estimated, the observer 11 compares, based on its correction function, the estimated values for the armature position z, the movement speed z' of the armature 4d and the armature acceleration z", as well as the current I with the actual values for the same. The correction function, described above, can be designed by means of different methods of linear and nonlinear control theory. In considering the current eddy induced in the armature, said eddies can be avoided by means of a suitable voltage regulating method so that there are no excessive energy losses. Moreover, higher accuracy of the control times can also be obtained. Furthermore, there is no need for design measures in terms of additional construction to avoid the current eddies. Rather, the current eddies are damped by suitably turning on and off the coil voltage in the requisite and desired degree.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling an electromagnetic actuator operating a gas exchange lift valve of an internal combustion engine, said actuator having an armature moving in an oscillating manner between two electromagnetic coils against at least one return spring force via an alternating supply of current to the two electromagnetic coils, the process comprising the acts of:

reducing a voltage applied to a respective one of the two electromagnetic coils catching the armature during a catch process as the armature approaches said one coil that is subjected first to a current flow; and wherein for reducing the voltage, the process selects a voltage control method having a voltage curve in which an eddy current in the armature is minimized, said eddy current being calculated via a mathematical model.

2. The process according to claim 1, wherein the voltage curve is determined in an empirical manner via a simulation.

3. The process according to claim 2, wherein the voltage curve is determined via a controller based design method with a variable structure.

4. The process according to claim 3, wherein the voltage curve is realized using pulse width modulation.

5. The process according to claim 2, wherein the voltage curve is realized using pulse width modulation.

6. The process according to claim 1, wherein the voltage curve is determined via a controller based design method with a variable structure.

7. The process according to claim 6, wherein the voltage curve is realized using pulse width modulation.

8. The process according to claim 1, wherein the voltage curve is realized using pulse width modulation.

* * * * *